United States Patent
Tamaoka

(10) Patent No.: US 7,525,231 B2
(45) Date of Patent: Apr. 28, 2009

(54) STATOR USED FOR RECORDING DISK DRIVING MOTOR, RECORDING DISK DRIVING MOTOR, AND RECORDING DISK DRIVING DEVICE

(75) Inventor: Takehito Tamaoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 462 days.

(21) Appl. No.: 11/279,756

(22) Filed: Apr. 14, 2006

(65) Prior Publication Data

US 2006/0232159 A1 Oct. 19, 2006

(30) Foreign Application Priority Data

Apr. 15, 2005 (JP) .............................. 2005-118270

(51) Int. Cl.
*H02K 1/00* (2006.01)
(52) U.S. Cl. ...................... 310/216; 310/179; 310/254
(58) Field of Classification Search ................. 310/179, 310/216–218, 254, 258, 259
See application file for complete search history.

(56) References Cited

U.S. PATENT DOCUMENTS

| | | | |
|---|---|---|---|
| 3,618,204 A * | 11/1971 | Valle ............................ | 29/593 |
| 4,620,301 A | 10/1986 | Koide | |
| 5,296,981 A | 3/1994 | Ogawa | |
| 5,319,270 A | 6/1994 | Tanaka et al. | |
| 5,670,837 A | 9/1997 | Boutaghou et al. | |
| 5,798,583 A | 8/1998 | Morita | |
| 5,930,076 A | 7/1999 | Morita | |
| 6,078,467 A | 6/2000 | Akutsu et al. | |
| 6,728,063 B1 | 4/2004 | Gustafson et al. | |
| 6,759,784 B1 | 7/2004 | Gustafson et al. | |
| 6,806,601 B2 | 10/2004 | Miyamoto | |
| 6,888,697 B1 | 5/2005 | Oveyssi | |
| 6,963,469 B1 | 11/2005 | Gustafson et al. | |
| 6,979,931 B1 | 12/2005 | Gustafson et al. | |
| 2006/0221495 A1* | 10/2006 | Tamaoka et al. ......... | 360/99.08 |
| 2006/0232159 A1* | 10/2006 | Tamaoka ................... | 310/216 |
| 2007/0046129 A1* | 3/2007 | Suginobu ................... | 310/216 |

FOREIGN PATENT DOCUMENTS

| | | |
|---|---|---|
| JP | H02-241347 A | 9/1990 |
| JP | H05-062447 A | 3/1993 |
| JP | H05-176485 A | 7/1993 |
| JP | H07-044991 A | 2/1995 |
| JP | H09-019095 A | 1/1997 |
| JP | H10-225028 A | 8/1998 |
| JP | H11-110896 A | 4/1999 |
| JP | 3049452 B2 | 3/2000 |
| JP | 2001-076417 A | 3/2001 |
| JP | 2004-282900 A | 10/2007 |

* cited by examiner

*Primary Examiner*—James Harvey
(74) *Attorney, Agent, or Firm*—Volentine & Whitt, PLLC

(57) ABSTRACT

The wire winding height of the first teeth over which the head portion moves is lower than the wire winding height of the second teeth over which is out of the moving range of the head portion. The first wire winding portion is formed so as to be radially longer than the second wire winding portion. With the configuration mentioned above, the number of winding of the wire around the first teeth (243a) is maintained without reducing the torque and varying the uniformity of the magnetic force in the circumferential direction which the stator generates.

25 Claims, 6 Drawing Sheets

STATOR USED FOR RECORDING DISK DRIVING MOTOR, RECORDING DISK DRIVING MOTOR, AND RECORDING DISK DRIVING DEVICE

BACKGROUND OF THE INVENTION

1. Technical Field

The present invention generally relates to an electric motor and a recording disk driving device including a motor, and more particularly relates to a stator for a motor.

2. Description of the Related Art

Conventionally, a recording disk driving device such as a hard disk drive includes a spindle motor (hereinafter referred to as a motor) which rotates a recording disk. These days, recording disk driving devices are installed in portable music players and many other portable devices, and there is a great demand for the recording disk driving device which has more storage capacity, and reduced thickness and dimensions. Whereby, in order to make the motor thinner and smaller, it is desired to make the motor thin and small.

It is known in the art that a portion of the stator of an inner rotor motor are arranged below a moving range of a magnetic head, reading/writing information from/to a recording disk, in order to reduce the size of the recording disk driving device.

Concerning about the motor in which the moving range of the magnetic head ranges over the portion of the stator, typically, winding height of wires wound around each tooth of the stator is substantially equal. Because of the configuration, a portion of an upper space of the stator (such as space between a coil and the recording disk, and space between a magnetic shield and the recording disk) other than the moving range of the magnetic head is vacant. However, it is difficult to reduce the thickness of the motor in amount of the vacant space while securing the moving range of the magnetic head.

The thickness of the motor may be reduced by reducing winding number of the coil around the teeth of the stator. However, upon reducing the winding number, torque of the motor is reduced as well. The winding number can be maintained by making an outer diameter of the stator bigger, but it results in making the motor bigger.

BRIEF SUMMARY OF THE INVENTION

A stator according to the preferred embodiment of the present invention constitutes a portion of an electric motor used to rotate a recording disk of a recording disk driving device having a head portion which read/write information from/to the recording disk.

The stator includes a core including a plurality of teeth radially arranged with tip portions thereof being toward to the center axis and a plurality of coils provided by winding wires around the plurality of teeth of the core.

A diameter of the wire is substantially same across the wire, and distance between the center axis and each of the tip portions of the teeth is substantially same.

The wire winding height around at least one of the teeth over which the head portion moves is less than that around other teeth over which are out of a moving range of the head portion.

In accordance with the preferred embodiments of the present invention, thickness and dimension of the stator may be reduced. In addition, torque decline and uniformity decline of the magnetic force in the circumferential direction may be prevented in accordance with the preferred embodiment of the present invention.

Moreover, according to the preferred embodiment of the present invention, the stator generates more circumferentially uniform magnetic force.

Therefore, the stator for the motor of the recording disk driving device, the motor to rotate the recording disk, and the recording disk driving device which is highly reliable while thickness and dimension are reduced.

In the description of the present invention, words such as upper, lower, left, right, upward, downward, top, and bottom for explaining positional relationships between respective members and directions merely indicate positional relationships and directions in the drawings. Such words do not indicate positional relationships and directions of the members mounted in an actual device.

DETAILED DESCRIPTION OF THE INVENTION

First Embodiment

Figure 1:
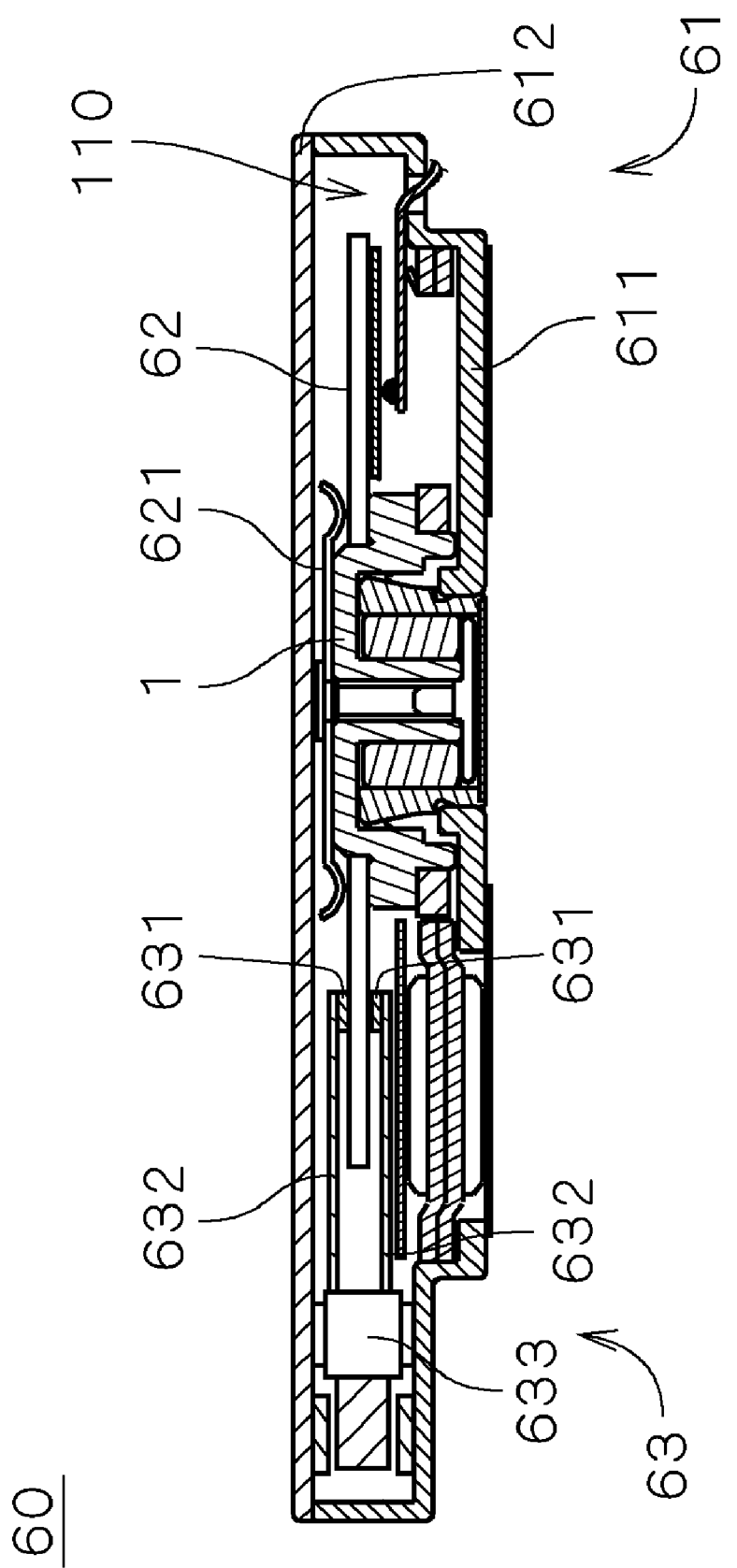
FIG. 1 shows an internal configuration of a recording disk driving device according to the first preferred embodiment of the present invention.

FIG. 1 shows the internal configuration of a recording disk driving device 60 including an electrically powered spindle motor 1 (hereinafter referred to as a motor 1) according to the first preferred embodiment of the present invention.

The recording disk driving device 60 is preferably a hard disk drive and includes: a recording disk 62 which has a discoid shape; an access portion 63 which read/write information from/to the recording disk 62; the motor 1 which supports and rotates the recording disk 62; and a housing 61 which accommodates the recording disk 62, access portion 63, and the motor 1 within an inside space 110.

The housing 61 includes a first housing member 611 which is a inoperculate box shape having an upper opening, to the inner bottom surface of which the motor 1 and the access portion 63 are attached, and a second housing member 612 which is a sheet shaped member occluding the upper opening of the first housing member 611 so as to define the inside space 110.

In the recording disk driving device 60, the housing 61 is provided by binding the first housing member 611 and the second housing members 612 so as to define the inside space 110 which is a clean chamber including only few dusts and debris.

The recording disk 62 is placed onto an upper portion of the motor 1 and is fixed by a damper 621. The access portion 63 includes a head 631 which adjoins the recording disk 62 and magnetically reads/writes information from/to the recording disk 62, an arm 632 which supports the head 631, and a head locating member 633 which moves the arm 632 so as to move the head 631 relative to the recording disk 62 and the motor 1.

By virtue of the configuration described above, the head 631 may access to the specific position adjoining the rotating recording disk 62 and may read/write information from/to the recording disk 62 with the head 631 adjoining to the recording disk 62.

Figure 2:
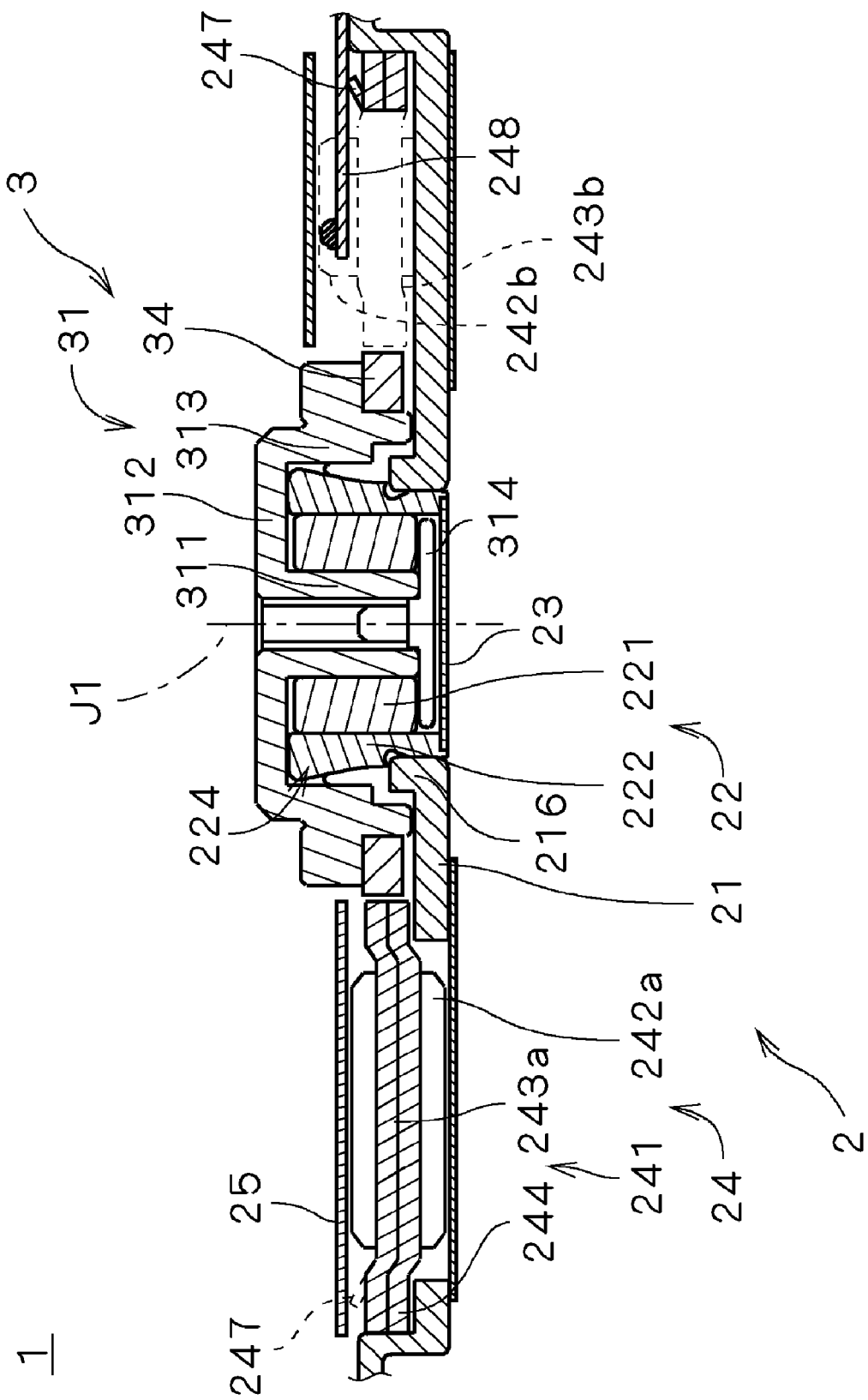
FIG. 2 is a longitudinal sectional view showing a configuration of a motor according to a preferred embodiment of the present invention.

FIG. 2 is a longitudinal sectional view showing the motor 1 used to rotate the recording disk 62 (see FIG. 1). While a section in the plane containing a center axis J1 of the motor 1 (which is also a center axis of later-described sleeve unit 24) is illustrated in FIG. 2, a portion of the configuration positioned deeper than the plane of the section is also depicted by broken lines.

The motor 1 is an inner rotor motor as shown in FIG. 2. The motor 1 includes a stationary portion 2 and a rotor portion 3. the rotor portion 3 is rotatably supported via a bearing mechanism employing hydrodynamic pressure of lubricant oil. The rotor portion may rotate relative to the stationary portion 2 with the center axis J1 as a center. For convenience in the following explanation, a rotor-section 3 side of the motor 1 along the center axis J1 will be described as an upper side and a stator 2 side of the motor 1 along the center axis J1 as an lower side, but the center axis J1 need not necessarily coincide with the direction of gravity. The rotor unit 3 includes a rotor hub 31 which retains the different parts of the rotor unit 3 and a rotor magnet 34 which is attached to the rotor hub 31 and is circumferentially arranged around the center axis J1. The rotor hub 31 may be made of any suitable materials, such as stainless steel, and includes: a shaft 311 which is a substantially cylindrical shape centering on the center axis J1 and extends downwardly (i.e., toward the stator unit 2); a plate section 312 which is discoid circular shape and expanding perpendicularly with respect to the center axis J1 from an upper end portion of the shaft 311; and a cylindrical section 313 which has a substantially cylindrical shape and extends downwardly at a rim of the circular plate section 312. A thrust plate 314 which is a substantially discoid shape is attached to a lower end portion of the shaft 311.

The stationary portion 2 includes a base plate 21 retaining the various parts of the stationary portion 2 and a sleeve unit 22 having a substantially cylindrical shape and being a part of the bearing mechanism into which the shaft 311 is inserted so as to support the rotor 3. The stationary portion 2 further includes a stator 24 attached to the base plate 21 at a portion around the sleeve unit 22 and a magnetic shield 25 which is a sheet shaped member arranged over the stator 24 and shields magnetic noise radiated from the stator 24.

The base plate 21 is a portion of the first housing member 611 (see FIG. 1) and is formed unitarily with the rest of the first housing member 611 by pressing sheet materials made of an aluminum, aluminum-alloy, or magnetic or non-magnetic ferrous-metal. The stator 24 generates torque centering on the center axis J1 between itself and the rotor magnet 24 arranged around the shaft 311.

The stator 24 is attached along the upper side of the base plate 21 by press-fitting or adhesives, and includes a core 241 formed by laminating two core plates made of silicon steel plates. The stator 24 further includes a plurality of coils (a first coil 242a and a second coil 242b described later) provided in predetermined positions on the core 241. Thickness of each core plate forming the core 241 is from about 0.1 mm to about 0.35 mm, more preferably about 0.2 mm.

Figure 3:
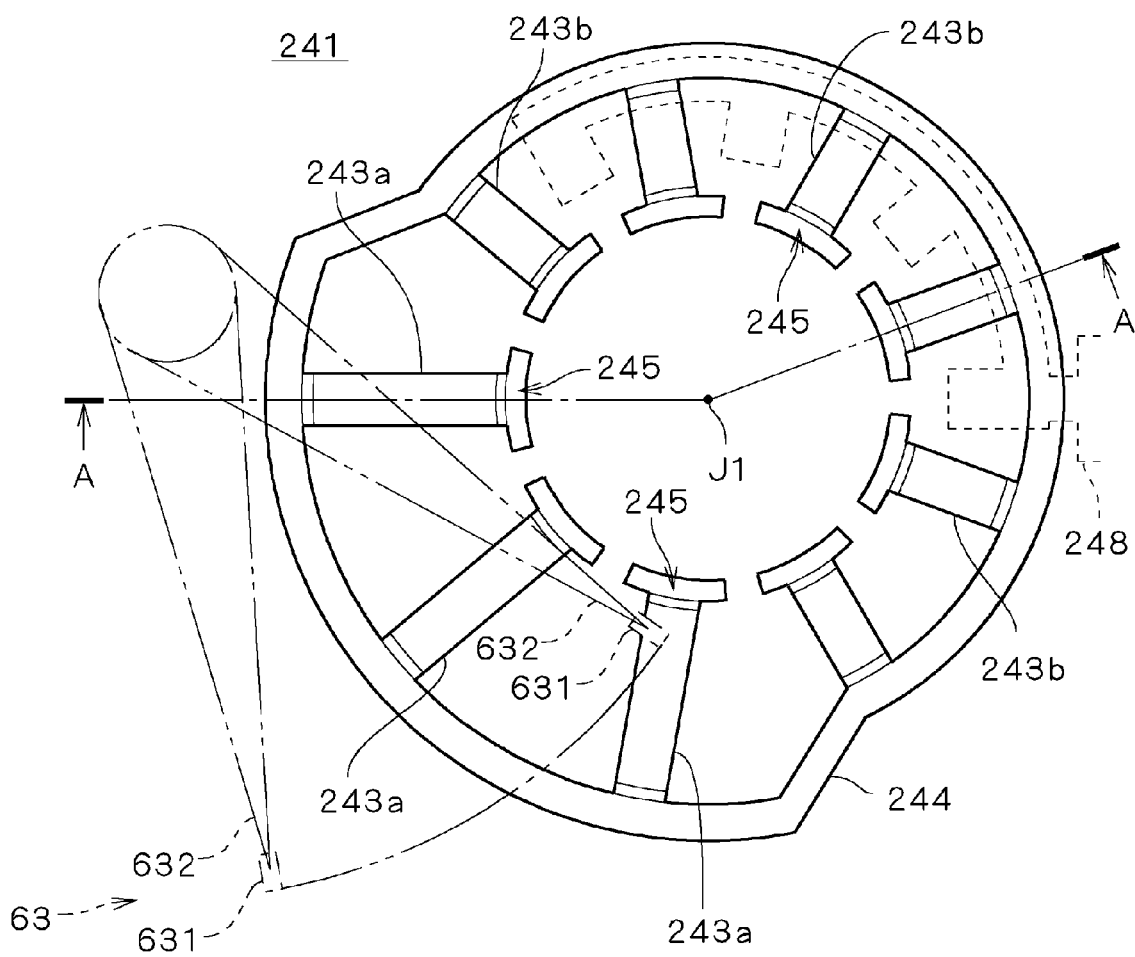
FIG. 3 is a plan view showing a core according to a preferred embodiment of the present invention.

FIG. 3 is a plan view showing the core 241. FIG. 3 shows the head portion 631 and the arm 632 of the access portion 62. FIG. 3 further shows a moving range of the head 631 and the arm 632 by chain double-bash lines. In the motor 1, a head portion which reads/writes information from/to the recording disk 62 (see FIG. 1) is constituted by the head 631 and the arm 632.

As shown in FIG. 3, the core 241 includes a plurality of teeth (nine teeth in this preferred embodiment). The teeth are radially arranged with the center axis J1 as the center, and their tip portions extends in radial direction toward to center axis J1. Three of the plurality of teeth 243a (hereinafter referred to as first teeth 243a in order to distinguish from other teeth), over which the head portion moves, extend longer into a teeth extending direction (i.e., the radial direction toward to the center axis J1) than the length of other teeth 243b (hereinafter referred to as second teeth 243b).

The core 241 includes a core back 244 which is a ring shape member supporting the first teeth 243a and the second teeth 243b along the outer side of the stator teeth. In each of the core plates forming the core 241, the portions, corresponding to the first teeth 243a, the second teeth 243b, and core back 244 respectively, are formed unitarily. By virtue of the configuration, the first teeth 243a, the second teeth 243b, and the core back 244 are magnetically connected.

In the stator 24, nine coils are provided by winding the wire, in which the wire winding height is from 0.05 mm to 0.3 mm (preferably 0.1 mm), around the nine teeth of the core 241 (hereinafter each of the coils provided on the first teeth 243a is referred to as a first coil 243a, and each of the coils provided on the second teeth 243b is referred to as a second coil 243b).

The wire from each coil is led into a circuit board 248 shown in FIGS. 2 and 3 via a projection 247 for locking a bridging wire which forms in between neighboring teeth in the core 241, and the wire is joined with solder to an electrode on the circuit board 248. The circuit board 248 is illustrated by broken lines in FIG. 3.

Figure 4:
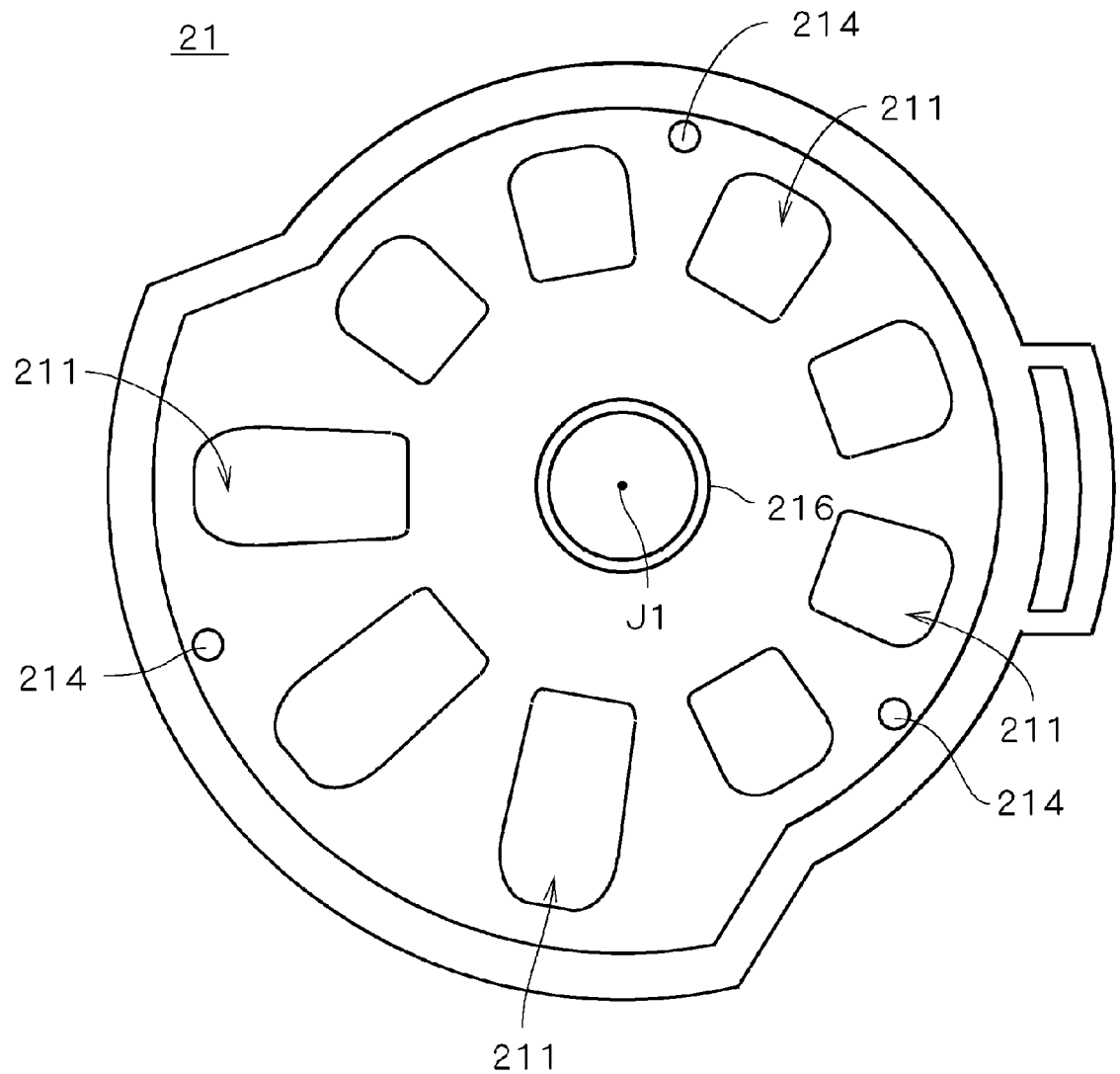
FIG. 4 is a plan view showing a base plate according to a preferred embodiment of the present invention.

FIG. 4 is a plan view showing the base plate 21. As shown in FIG. 4, the base plate 21 includes three stator supporting portions 214 which upwardly protruding from an upper surface of the base plate 21. The stator supporting portions 214 are equally angularly spaced with centering on the center axis J1 and support the stator 24 along its lower side by abutting to the core back 244 of the stator 24 which is to be attached to the base plate 21 (see FIG. 3). The stator supporting portion 214 is formed concurrently with the press-working of the base plate 21.

As shown in FIGS. 2 and 4, a sleeve attachment portion 216 is formed at a central portion of the base plate 21. The sleeve attachment portion 216 has a substantially cylindrical shape and upwardly protrudes from the base plate 21 with centering on the center axis J1. As shown in FIG. 2, the sleeve unit 22 includes a sleeve 221 having a substantially cylindrical shape, into which the shaft 311 is inserted, and a sleeve housing 222 having a substantially cylindrical shape which attached to an outer circumference of the sleeve 221 by adhesives. The sleeve unit 22 is inserted into the sleeve-attachment portion 216 to attach it to the base plate 21.

The sleeve 221 is inserted into the sleeve housing 222 with a gap maintained between the sleeve 221 and an inner circumferential surface of the sleeve housing 222 (i.e., the sleeve is inserted at a clearance fit), and is fixed to the sleeve housing 222 via an adhesive. The sleeve 221 is a porous member, formed by pressure-molding, putting a powdered starting material into a mold and press-hardening the material, and then sintering the compact and putting the sintered compact again into a mold to compress it into final form. Various kinds of metal powders, powders of metallic compounds, powders of non-metallic compounds, etc. may be used as the starting material for forming the sleeve 221 (for example: a blend of iron (Fe) and copper (Cu) powders; a blend of copper and tin (Sn) powders; a blend of copper, tin and lead (Pb) powders; or a blend of iron and carbon (C) powders).

A flange portion 224 of the sleeve housing 222 is unitarily formed along the outer circumference of the sleeve unit 22 at the upper portion of the sleeve housing 222. The flange portion 224 bulges outwardly with respect to the center axis J1. The opening along a lower end of the sleeve unit 22 is occluded by a sealing cap 23 having a substantially discoid shape. Therefore, the opening of the base plate 21 along a lower side of the sleeve attachment portion 216 is occluded by the sleeve housing 222 and the sealing cap 23. As shown in FIG. 4, a plurality of through hole portions 211 which penetrate the base plate 21 is provided on the base plate 21. Through hole portions 211 are provided at the positions which correspond to the first teeth 243a and the second teeth 243b, arranged around the sleeve attachment portion 216 (see FIG. 3).

Figure 5:
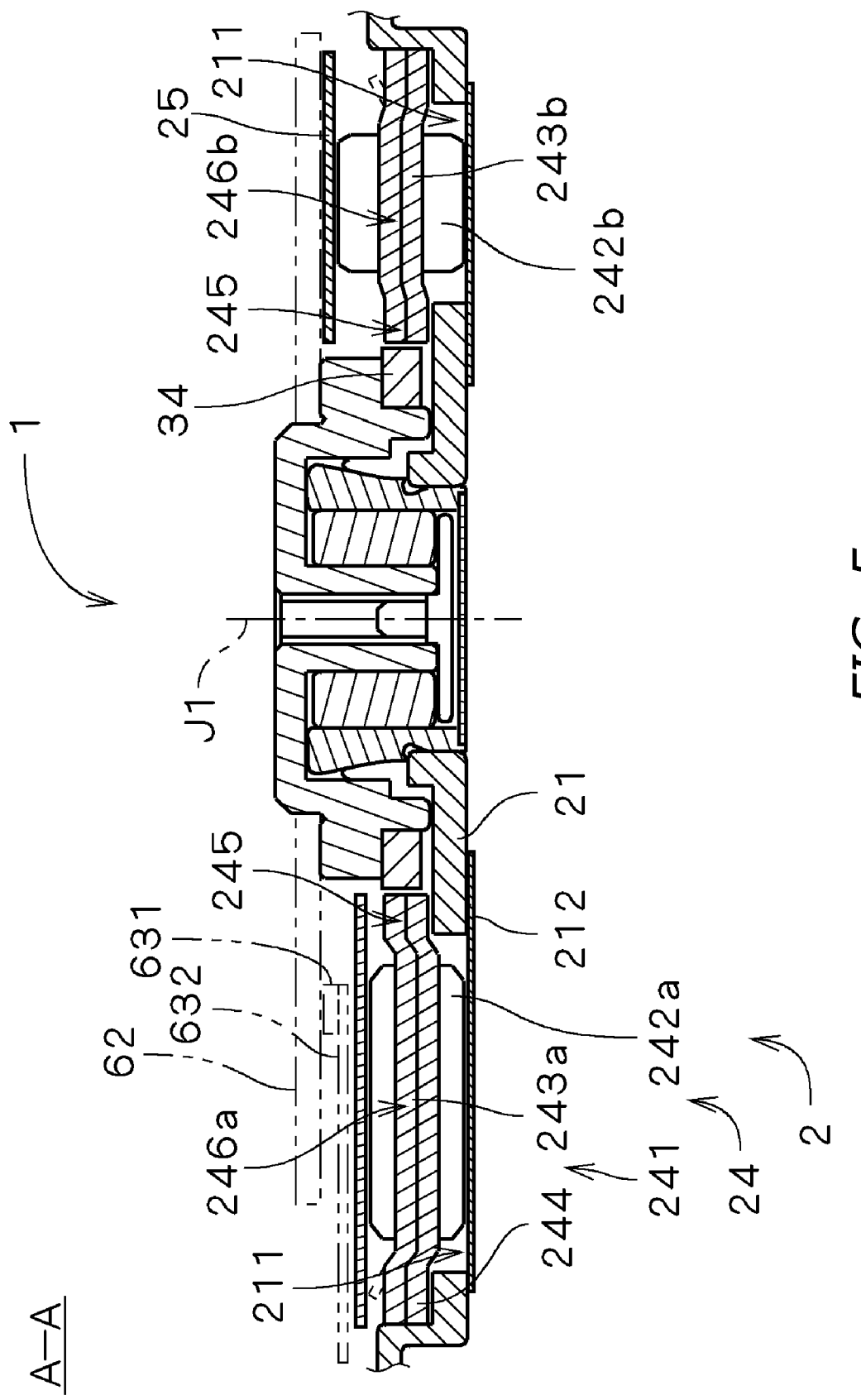
FIG. 5 is a sectional view showing a motor according to a preferred embodiment of the present invention.

FIG. 5 is a sectional view showing a cross section of motor 1 along with A-A shown in FIG. 3. As shown in FIG. 5, with the stator 24 being attached to the base plate 21, lower sides of the first coil 242a provided on the first teeth 243a and the second coil 242b provided on the second teeth 243b are accommodate into corresponding through hole portions 211 of the base plate 21 without downwardly protruding from the lower surface of the base plate 21. Therefore, the thickness of the motor 1 may be reduced without overly reducing the thickness of the base plate 21.

In the stationary portion 2, the through hole portions 211 into which the first coil 242a and the second coil 242b are to be inserted are filled with adhesive, whereby the first coil 242a and the second coil 242b are fixed to the base plate 21 and the through hole portions 211 are sealed. The base plate 21 includes a sealing member 212 having a sheet shape (such as a flexible circuit board and a name plate). The sealing member 212 occludes through hole portions 211 along an opposite side (lower side) of the side on which the stator 24 is attached. The seal portion 212 is attached to the lower main surface of the base plate 21 via an adhesive layer or a glue layer.

As shown in FIGS. 3 and 5, tip portions 245 which are a radially inwardly tip portions of the first teeth 243a and the second teeth 243b are equally angularly spaced in the circumferential direction with centering on the center axis J1. Moreover, the distance between the center axis J1 and each tip portion 245 is substantially same. As shown in FIG. 5, each of the tip portion 245 are arranged so as to face the outer circumferential surface of the rotor magnet 34, whereby torque is efficiently generated between the stator 24 and the rotor magnet 34.

In the stator 24, a wire winding portion 246a of the first teeth 243a to which the wire is wound (hereinafter referred to as a first wire winding portion 246a) is downwardly bent at a radially middle portion of the first teeth 243a. The distance between the upper surface of the first wire winding portion 246a and a portion where the recording disk 62 is placed (illustrated in FIG. 5 by chain double-dashed line) is greater than the distance between upper surface of the tip portion 245 of the first teeth 243a (and the second teeth 243b) and the portion where the recording disk 62 is placed. A portion of the second teeth 243b to which the wire is wound (hereinafter referred to as a second wire winding portion 246b) is upwardly bent at a radially middle portion of the second teeth 243b. The distance between the upper surface of the second wire winding portion 246b and a portion where the recording disk 62 is placed is smaller than the distance between upper surface of the tip portion 245 of the second teeth 243b (and the first teeth 243a) and the portion where the recording disk 62 is placed. As shown in FIG. 5, the length of the first wire winding portion 246a, along the first-teeth-243a-extending direction is longer than the length of the second wire winding portion 246b, along the second-teeth-243b-extending direction. More preferably, the length of the first wire winding portion 246a is from 1.3 to 4 times longer than the length of the second wire winding portion 246b.

In the stator 24, the maximum accumulated height of the wire (wire winding height) wound around the first wire winding portion 246a of the first teeth 243a (i.e., the maximum thickness of the first coil 242a at the upper or lower side of the first teeth 243a) is smaller than the maximum accumulated height of the wire wound around the second wire winding portion 246b of the second teeth 243b. The winding number of the wire around the first teeth 243a is same to the winding number of the wire around the second teeth 243b. The winding number of the wire (i.e., the number of turns) around the first teeth 243a and the second teeth 243b is from 30 to 120 (preferably from 60 to 100). In this preferred embodiment, the number of turns is 80.

The first coil 242a is arranged so as to adjoin the head portion at the lower side of the head portion (i.e., the head 631 and the arm 632 illustrated by chain double-dash lines in FIG. 5) whose upper end surface is adjacent to the recording disk 62. The second coil 242b is arranged such that the upper end surface thereof adjoins the lower surface of the recording disk 62.

As shown in FIG. 5, the magnetic shield 25 is circular sheet shaped member surrounding the rotor hub 31. The magnetic shield 25 is arranged between the upper end surface of the first coil 242a and head portion facing the lower surface of the recording disk 62 at the above of the first coil 242a. The magnetic shield 25 is also arranged between the upper end surface of the second coil 242b and the lower surface of the recording disk 62 at the above of the second coil 242b. In other words, a portion of the magnetic shield 25 above the upper side of the first coil 242a (i.e., the portion below the moving range of the head portion) is formed into a concave shape.

Subsequently, the bearing mechanism, which utilizes hydrodynamic pressure to rotatably support the rotor unit 3 relative to the stator unit 2 in the motor 1 is described below.

As shown in FIG. 2, gaps are provided at the following portions of the motor 1, the portions include: between the lower surface of the circular plate section 312 of the rotor hub 31 and the upper end surface of the sleeve housing 222; between the inner circumferential surface of the sleeve 221 and the outer circumferential surface of the shaft 311; between the lower end surface of the sleeve 221 and the upper surface of the thrust plate 314; between the lower surface of the thrust plate 314 and the upper surface of the sealing cap 23; and between outer circumferential surface of the flange portion 224 of the sleeve housing 222 and the inner circumferential surface of the cylindrical section 313 of the rotor hub 31. These gaps are continuously and consistently filled with the lubricant oil.

An inclined surface is provided on the outer circumferential surface of the flange portion 224 of the sleeve housing 222, where the housing gradually constricts in outer diameter heading downward, while the cylindrical section 313 of the rotor hub 31 is formed so that the inner circumferential surface thereof, which opposes the outer-side surface of the flange portion 224, is of constant diameter. With this configuration, the boundary surface of the lubricating oil and air at a gap maintained between the flange portion 224 and the cylindrical portion 313 forms a meniscus shape under the capillary action and surface tension, constituting a taper seal, whereby the gap functions as an oil buffer, preventing outflow of the lubricating oil.

On the upper end surface of the sleeve housing 222 and the lower end surface of the sleeve 221, grooves (for example, grooves in a spiral shape) for inducing the dynamic pressure in the lubricant oil directed toward the center axis J1 is provided. With the aforementioned end surfaces and the surfaces facing thereto, a thrust dynamic bearing section is defined.

Meanwhile, grooves (for example, herringbone grooves provided on the inner circumferential surface of the sleeve 221 in an axially spaced manner) for inducing hydrodynamic pressure in the lubricating oil are formed on the surfaces of the shaft 311 and the sleeve 221 facing each other. With the surfaces facing each other, a radial dynamic bearing section is defined.

In the motor 1, the fact that the rotor unit 3 is non-contact supported, via the lubricating oil, by the hydrodynamic-pressure-employing bearing mechanism enables the rotor unit 3 to spin with high precision and low noise.

In particular, in the hydrodynamic bearing mechanism according to the preferred embodiment of the present invention, abnormal contact between the shaft 311 and the sleeve 221 caused by air bubbles produced within the lubricating oil, and lubricating oil leakage and similar problems due to the swelling of bearing-internal air may be all but eliminated.

Moreover, the fact that the sleeve 221 is a porous component pressured-molded from a powdered starting material means that lubricating oil is powerfully retained in the bearing mechanism, and means that particles and other impurities within the lubricating oil are absorbed, which keeps the lubricating oil clean.

As described above, in the motor 1, the gaps formed in between sleeve unit 22 (i.e., the sleeve 221 and the sleeve housing 222), the rotor hub 31, and the sealing cap 23 are filled with the fluid lubricating oil. Thus when the rotor unit 3 rotates, hydrodynamic pressure is induced to support the rotor unit 3 via the lubricating oil. When the rotor portion 3 rotates with the center axis J1 as center, the recording disk 62 which attached to the rotor portion 3 is rotary driven.

Subsequently, methods of manufacturing the stator 24 and attaching the stator 24 to the base plate 21 are described. Firstly, in order to manufacture the stator 24, the core plate is formed by piercing the silicon steel plate (or other electromagnetic steel plate) into a shape corresponding to the shape of the core 241 by using die. Secondly, as shown in FIG. 5, the portion of the core plate corresponding to the first wire winding portion 246*a* is bent by press-working so as to form a downward convex, and the portion of the core plate corresponding to the second wire winding portion 246*b* is bent by press-working so as to form a upward convex.

Thirdly, two core plates are laminated and fixed by fixing method such as calking or laser welding. Then, on the surface of the laminated core plate is painted with nonconductive resin by such as electrodeposition and powder coating, and the core 241 is formed as a final product. After the core 241 is formed, the first coil 242*a* and the second coil 242*b* are formed by winding the wire around the first wire winding portion 246*a* and the second wire winding portion 246*b* for the predetermined number of turns by using a coil winding machine. After the wires are wound, the fairing process may be carried out to fair the coil if needed. Finally, the wires from the first coil 242*a* and the second coil 242*b* are joined with solder to the circuit board 248 (see FIG. 2) and the manufacturing of the stator 24 is completed.

In the manufacturing of the stator 24, the coil winding machine is fine tuned to precisely wind the wire around each tooth without single turn error. However, even if the program glitch of the coil winding machine makes the number of turns varied among the first teeth 243*a* and the second teeth 243*b*, the magnetic property of the stator 24 does not change dramatically as long as the number-of-turn difference is less than 3% of total number of turns of each teeth. Therefore, the number of turns may be recognized substantially same among the teeth of the stator 24.

Then the stator 24 is fixed to the base plate 21 with outer circumferential surface of the core back 244 being abutted against the base plate 21. The stator 24 may be fixed to the base plate 21 by press-fitting or using adhesives applied to the portion of the base plate 21 against which the core back 244 is abutted.

In the stator 24 of the motor 1, the wire winding height of the first wire winding portion of the first teeth 243*a*, over which the head portion (i.e., head 631 and arm 632) moves, is less than the wire winding height of the second wire winding portion of the second teeth 243*b*.

By virtue of the configuration mentioned above, the height of the portion of the stator 24 over which the head portion moves is lower than the height of other portion of the stator 24.

In the portion of the stator 24 over which is out of the moving range of the head portion the second coil 242*b* is densely arranged within the space under the recording disk 62 so that the number of turns around the second teeth 243*b* is secured without extending the length of the second teeth 243*b* (in other words, without extending the diameter of the stator 24 at the second teeth 243*b* side). As a result, thickness and dimension of the stator 24 may be reduced. Consequently, thickness and dimension of the motor 1 and the recording disk driving device 60 may be reduced.

In the stator 24, the length of the first coil winding portions 246*a* of the three first teeth 243*a* is longer than the length of the second coil winding portions 246*b* of other six second teeth 243*b*. In the first teeth 243*a*, the wire winding height should be kept low because the head portion may move over the first teeth 243*a*. By virtue of the configuration mentioned above, the number of turns around the first teeth 243*a* is maintained while the wire winding height is kept low. As a result, the torque decline and the coil-resistance increase of the motor 1 may be prevented, such that the electric-consumption increase may be prevented. Moreover, with the configuration mentioned above, the stator 24 generates the more circumferentially uniform magnetic force, such that the occurrence of the repeatable run out (RRO) and the vibration may be prevented.

In the stator 24, the number of turns around the first teeth 243*a* is equal to the number of turns around the second teeth 243*b*. By virtue of the configuration, back electromotive force (back EMF) at the tip portion 245 of each of the teeth may be substantially equal. Consequently, the uniformity of the magnetic force in the circumferential direction may be improved.

Moreover, the uniformity of the magnetic force in the circumferential direction may be further improved by the tip portions 245 of teeth being equally angularly spaced with centering on the center axis J1.

In the first teeth 243*a*, the first wire winding portions 246*a* are downwardly bent so that the first wire winding portions 246*a* and the recording disk 62 are further distanced. By virtue of the configuration, the head portion may move between the upper end surface of the first coil 242*a* and the recording disk 62 while the thickness of the stator 24 is reduced.

In the second teeth 243*b*, the second wire winding portion 246*b* is upwardly bent so that the second wire winding portion 246b and the recording disk 62 come close each other. By virtue of the configuration, the second coil 242b may be densely arranged within the space below the recording disk 62 while the thickness of the stator 24 is reduced.

Second Embodiment

Figure 6:
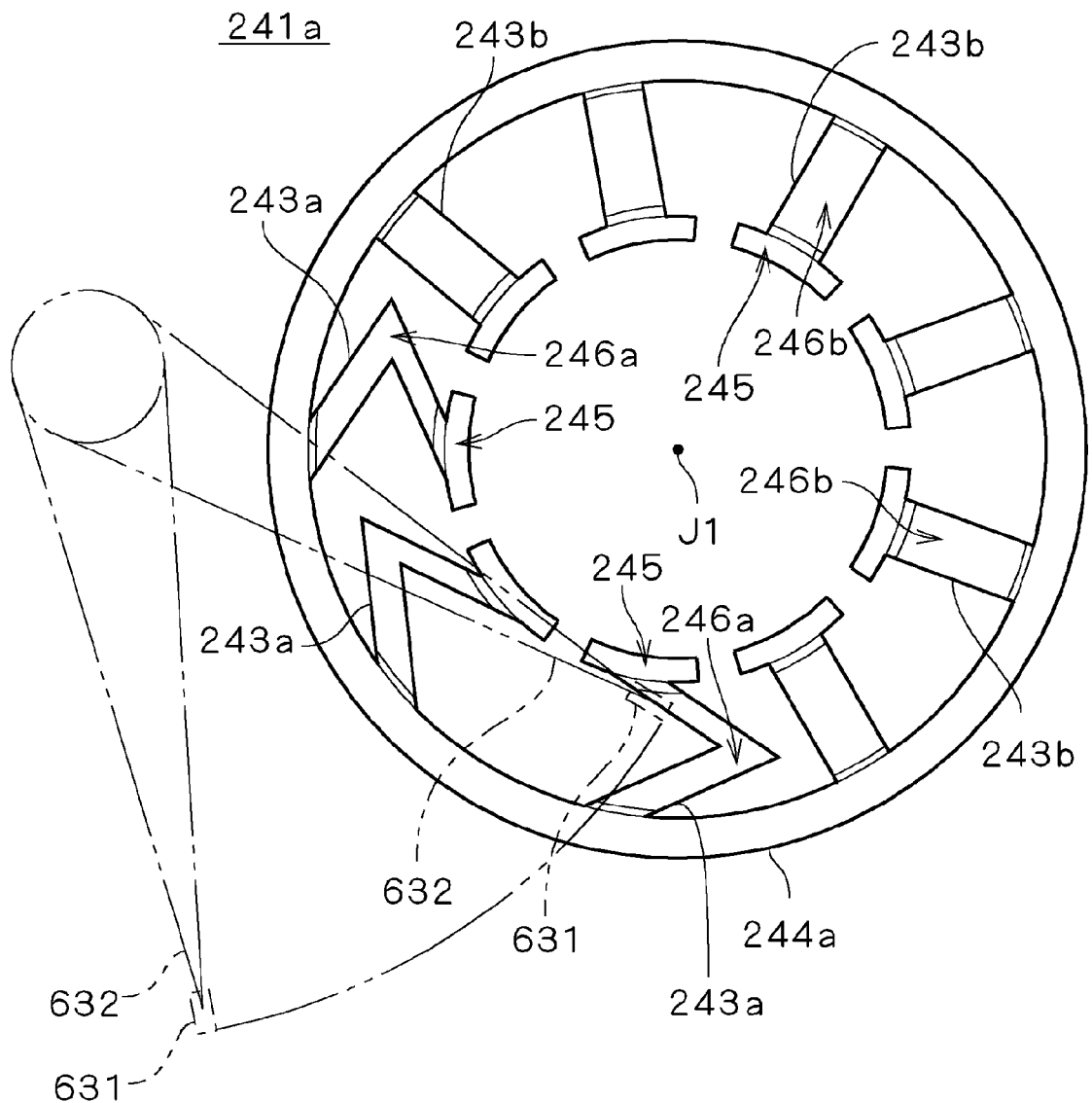
FIG. 6 is a plan view showing a core according to the second preferred embodiment of the present invention.

A motor according to the second preferred embodiment of the present invention is described below. FIG. 6 is a plan view illustrating a core according to the second preferred embodiment of the present invention. The motor according to the second preferred embodiment of the present invention has a core 241a whose shape is different from the core 241 illustrated in FIG. 3. The rest of the configuration is the same as that of FIG. 5, and is labeled with the same reference marks in the explanation that follows.

As shown in FIG. 6, the core 241a includes three first teeth 243a over which the head portion (i.e., the head 631 and the arm 632) moves and six second teeth 243b over which is out of the moving range of the head portion. The core 241a also includes the core back 244 which is a ring shape member supporting the first teeth 243a and the second teeth 243b along the outer side of the stator teeth.

The first teeth 243a and the second teeth 243b are radially arranged with the center axis J1 as the center, and their tip portions are toward to center axis J1. In the first teeth 243a, the first wire winding portion 246a are bent into a circumferential direction with the center axis J1 as a center relative to the radial direction with the center axis J1 as a center (the bend-direction is changed in the middle of the first wire winding portion).

A core back 244a is a circular shaped member centering on the center axis J1. However, the core back 244a of the core 241a may be formed in the shape other than the circular shape. Alike the first preferred embodiment, the core back 244a of the core 241a may be formed in a shape whose semidiameter centering on the center axis J1 makes longer at the first teeth 243a side.

Alike the first preferred embodiment, tip portions 245 which are a radially-inward-tip portion of the first teeth 243a and the second teeth 243b are equally angularly spaced in the circumferential direction with centering on the center axis J1.

The length of the first wire winding portion 246a, along the first-teeth-243a-extending direction, is longer than the length of the second wire winding portion 246b, along the second-teeth-243b-extending direction. More preferably, the length of the first wire winding portion 246a is from 1.3 to 4 times longer than the length of the second wire winding portion 246b.

In the first teeth 243a, the first wire winding portion 246a is downwardly bent, such that the upper surface of the first wire winding portion 246a is further distant from the position, where the recording disk 62 is to be placed, than the tip portions 245 of the first teeth 243a (and the second teeth 243b) (see FIG. 5).

In the second teeth 243b, the second wire winding portion 246b is upwardly bent, such that the upper surface of the second wire winding portion 246a comes close to the position, where the recording disk 62 is to be placed, than the tip portions 245 of the second teeth 243b (and the first teeth 243a) (see FIG. 5).

In the stator of the motor according to the second preferred embodiment of the present invention, alike the first preferred embodiment, the wire winding height around the first wire winding portion of the first teeth 243a is lower than the wire winding height around the second wire winding portion of the second teeth 243b (see FIG. 5).

The number of turns around the first teeth 243a is equal to the number of turns around the second teeth 243b. The winding number of the wire (i.e., the number of turns) around the first teeth 243a and the second teeth 243b is from 30 to 120 (preferably from 60 to 100). In the second preferred embodiment, the number of turns is 80 as well as in the first preferred embodiment.

In the stator of the motor according to the second preferred embodiment, alike the first preferred embodiment, the wire winding height of the wire wound around the first wire winding portion 246a is lower than the wire winding height of the second wire winding portion 246b. As a result, the thickness and the dimension of the stator may be reduced.

Moreover, the length of the first wire winding portions 246a of the three first teeth 243a is longer than the length of the second wire winding portions 246b of other six second teeth 243b respectively. With the configuration mentioned above, the stator generates more circumferentially uniform magnetic force, such that the occurrence of the repeatable run out (RRO) and the vibration may be prevented. Moreover, torque decline may be prevented.

In the stator of the motor according to the second preferred embodiment, the first wire winding portion 246a of the first teeth 243a are bent relative to the radial direction centering on the center axis J1 as a center. By virtue of the configuration mentioned above, the length of the first wire winding portion 246a may be longer than the length of the second wire winding portion 246b without (or with slightly) enlarging the semidiameter of the core back 244a at the first teeth 243a side thereof. As a result, the dimension of the stator may be reduced.

Alike the first preferred embodiment, in the stator of the motor according to the second preferred embodiment, the number of turns around the first teeth 243a is equal to the number of turns around the second teeth 243b. Moreover, the tip portions 245 of the teeth are equally angularly spaced with centering on the center axis J1. By virtue of the configuration mentioned above, the uniformity of the magnetic force in the circumferential direction may be further improved. The thickness of the stator may be further reduced by downwardly bending the first wire winding portion 246a and upwardly bending the second wire winding portion 246b.

While embodiments of the present invention have been described in the foregoing, the present invention is not limited to the embodiments detailed above, in that various modifications are possible.

The core 241 may be constituted by other than two core plates. For example, the core may be formed by laminating more than two core plates, and may be constituted by single plate made of the silicon steel. For further reducing the thickness of the recording disk driving device 60, the magnetic shield 25 may be removed.

The through hole portion 211 receiving the portion of the first teeth 243a and the second teeth 243b may not be provided on the base plate 21 from the viewpoint of rigidifying of the base plate 21. The projection 247 for locking a bridging wire may be formed separately with the core 241. For example, the projection 247 may be formed as a part of the insulating resin member which is attached to the core 241.

The number of turns of the first wire winding portion 243a is preferably same as the number of turns of the second wire winding portion 243b from the viewpoint of further improvement of the uniformity of the magnetic force in the circumferential direction. However, if the magnetic force varies in the circumferential direction because of the length differences of the first teeth 243a and the second teeth 243b caused by such as casting errors, the number of turns may be modified in order to improve the uniformity of the magnetic force in the circumferential direction.

In the stator 24, if the wire is wound so as to form the six layers of the wire around the first teeth 243a and the wire is wound so as to form eight layers of the wires around the second teeth 243b, the length of the first wire winding portion may be more than 1.3 times longer than the length of the second wire winding portion 246b. If six layers of the wire around the first teeth 243a and two layers of the wire around the second teeth 243b are provided, the length of the first wire winding portion 246a is 4 times longer than the length of the second wire winding portion 246b. The length of the first wire winding portion 246a may be 4 times longer than the length of the second wire winding portion 246b, or may be shorter than 1.3 times length of the second wire winding portion 243b depending on the layer number of wire around the first teeth 243a and the second teeth 243b.

In the motor according to the preferred embodiments of the present invention, so-called gas dynamic bearings, in which air serves as the working fluid, may be utilized for the bearing mechanism. Moreover, the bearing mechanism of the motor according to the preferred embodiment of the present invention may be other than the bearing utilizing the dynamic pressure. The bearing mechanism may be such as ball bearings.

A motor involving the embodiments described above may be employed as the drive source for other devices apart from hard-disk drives-for example, disk-drive devices such as removable disk devices.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A stator for an electric motor, comprising:
a core including a plurality of teeth extending radially and spaced from each other about a center axis with tips of the teeth being oriented toward said center axis, said teeth including a first tooth and a second tooth; and
wire wound a number of times around each of said teeth of said core so as to form coils around the teeth, respectively, wherein:
the diameter of said wire is substantially the same along the length of said wire;
the respective distances between said center axis and each of the tips of said teeth are substantially the same;
a wire winding height of the wire around said first tooth is less than a wire winding height of the wire around said second tooth, the wire winding heights corresponding to the overall thicknesses of the coils, respectively, in the direction of the center axis, and
the number of windings of the coil disposed around said first tooth is substantially the same as the number of windings of the coil disposed around said second tooth.

2. A stator as set forth in claim 1, wherein the length of a wire winding portion of said first tooth that is spanned by the wire wound around said first tooth is greater than the length of a wire winding portion of said second tooth that is spanned by the wire wound around said second tooth.

3. A stator as set forth in claim 2, wherein the length of said wire winding portion of said first tooth is about 1.3 times to about 4 times that of the length of said wire winding portion of said second tooth.

4. A stator as set forth in claim 2, wherein said first tooth includes a portion inclined relative to a radial plane perpendicular to said center axis.

5. A stator as set forth in claim 4, wherein the core further comprises a core back from which the teeth extend, and the inclined portion of said first tooth is interposed between the core back and said wire winding portion of said first tooth such that said wire winding portion of said first tooth is axially offset in a downward direction relative to the core back.

6. A stator as set forth in claim 5, wherein said second tooth includes a portion inclined relative to the radial plane perpendicular to said center axis.

7. A stator as set forth in claim 6, wherein the inclined portion of said second tooth is interposed between the core back and said wire winding portion of said second tooth, and the inclined portions of the first and second teeth extend from the core back oppositely relative to said radial plane such that said wire winding portion of said second tooth is axially offset relative to the core back in an upward direction opposite to said downward direction.

8. In a recording disk driving device having a head portion which reads/writes information from/to a recording disk,
a stator comprising a core including a plurality of teeth extending radially and spaced from each other about a center axis with tips of the teeth being oriented toward said center axis, said teeth including a first tooth within an axial projection of a range over which said head portion moves in the disk driving device and a second tooth which is outside the axial projection of the range over which said head portion moves in the disk driving device, and
wire wound a number of times around each of said teeth of said core so as to form coils around the teeth, respectively; and
a magnetic shield having a substantially circular shape disposed over said teeth so as to lie within the axial projection of a range over which said head portion moves in the disk driving device, and magnetically shielding said head portion and said teeth; and wherein:
the diameter of said wire is substantially the same along the length of said wire;
the respective distances between said center axis and each of the tips of said teeth are substantially the same;
a wire winding height of the wire around said first tooth is less than a wire winding height of the wire around said second tooth, the wire winding heights corresponding to the overall thicknesses of the coils, respectively, in the direction of the center axis;
a portion of said magnetic shield lying within the axial projection of the range over which said head portion moves in the disk driving device is axially offset downwardly relative to another portion of said magnetic shield which is outside the axial projection of the range over which said head portion moves in the disk driving device; and
the length of a wire winding portion of said first tooth that is spanned by the wire wound around said first tooth is greater than the length of a wire winding portion of said second tooth that is spanned by the wire wound around said second tooth.

9. A stator as set forth in claim 1, wherein the tips of said teeth are equally angularly spaced in a circumferential direction around said center axis.

10. A In a recording disk driving device as set forth in claim 8, the stator wherein the length of said wire winding portion of said first tooth is about 1.3 times to about 4 times that of the length of said wire winding portion of said second tooth.

11. A stator as set forth in claim 1, wherein said core further comprises an annular core back magnetically connected to said teeth at ends of said teeth opposite the tips of said teeth.

12. An electric motor, comprising:
a stationary portion including said stator as set forth in claim 1 and a base portion retaining said stator,
a rotor portion including a rotor magnet facing towards the tips of the teeth of said stator; and
a bearing mechanism supporting said rotor portion so as to be rotatable relative to said stationary portion about said center axis.

13. A recording disk driving device for reading/writing information from/to a disk, the recording disk driving device comprising:
a recording disk storing information;
a motor as set forth in claim 12 for rotating said recording disk;
a head portion that reads/writes information from/to said recording disk; and
a head locating device that moves said head portion relative to the recording disk.

14. A stator for an electric motor, comprising:
a core including $3n$ teeth (wherein n is an integer greater than zero) extending radially and spaced from each other about a center axis with tips of the teeth being oriented toward said center axis, said teeth including a first tooth and a second tooth; and
wire wound a number of times around each of said teeth of said core so as to form coils around the teeth, respectively, wherein:
the diameter of said wire is substantially the same along the length of said wire;
the respective distances between said center axis and each of the tips of said teeth are substantially the same;
a wire winding height of the wire around said first tooth is less than a wire winding height of the wire around said second tooth, the wire winding heights corresponding to the overall thicknesses of the coils, respectively, in the direction of the center axis, and
the length of a wire winding portion of said first tooth that is spanned by the wire wound around said first tooth is greater than the length of a wire winding portion of said second tooth that is spanned by the wire wound around said second tooth.

15. In a recording disk driving device as set forth in claim 8, the magnetic shield wherein the width in the radial direction of said magnetic shield of a portion of the shield disposed substantially above said first tooth is greater than that of a portion of the shield disposed substantially above said second tooth.

16. A stator as set forth in claim 14, wherein the length of said wire winding portion of said first tooth is about 1.3 times to about 4 times that of the length of said wire winding portion of said second tooth.

17. A stator as set forth in claim 14, wherein said first tooth includes a portion inclined relative to a radial plane perpendicular to said center axis.

18. A stator as set forth in claim 17, wherein the core further comprises a core back from which the teeth extend, and the inclined portion of said first tooth is interposed between the core back and said wire winding portion of said first tooth such that said wire winding portion of said first tooth is axially offset in a downward direction relative to the core back.

19. A stator as set forth in claim 18, said second tooth includes a portion inclined relative to the radial plane perpendicular to said center axis.

20. A stator as set forth in claim 19, wherein the inclined portion of said second tooth is interposed between the core back and said wire winding portion of said second tooth, and the inclined portions of the first and second teeth extend from the core back oppositely relative to said radial plane such that said wire winding portion of said second tooth is axially offset relative to the core back in an upward direction opposite to said downward direction.

21. A stator as set forth in claim 14, wherein the number of windings of said wire around said first tooth is substantially same as number of windings of the wire around said second tooth.

22. A stator as set forth in claim 14, wherein the tips of said $3n$ teeth are equally angularly spaced in a circumferential direction around said center axis.

23. A stator as set forth in claim 14, wherein a single phase of said wire is wound around each of said $3n$ teeth; and the wire provides the adjacent ones of said $3n$ teeth with different phases from each other.

24. A stator as set forth in claim 14, wherein said core further comprises an annular core back magnetically connected to said $3n$ teeth at ends of said teeth opposite the tips of said teeth.

25. A stator as set forth in claim 14, wherein: n is 3.

* * * * *